United States Patent [19]
Welker

[11] Patent Number: 5,769,375
[45] Date of Patent: Jun. 23, 1998

[54] POSITIONABLE HOLDER FOR SAMPLE CYLINDER

[75] Inventor: Brian H. Welker, Sugar Land, Tex.

[73] Assignee: Welker Engineering Company, Sugar Land, Tex.

[21] Appl. No.: 584,771

[22] Filed: Jan. 11, 1996

[51] Int. Cl.[6] ................................................. F21L 15/08
[52] U.S. Cl. ........................................................ 248/231.71
[58] Field of Search ............................. 248/231.71, 313, 248/689, 205.2, 291.1, 292.12, 309

[56] References Cited

U.S. PATENT DOCUMENTS

| | | | |
|---|---|---|---|
| 2,683,640 | 7/1954 | Mangine | 311/103 |
| 2,877,976 | 3/1959 | Massari | 248/313 |
| 3,603,550 | 9/1971 | Byrd | 248/313 |
| 3,780,972 | 12/1973 | Brodersen | 248/313 |
| 4,721,276 | 1/1988 | Moss | 248/311.2 |
| 4,969,618 | 11/1990 | Thompson | 248/313 |
| 5,046,945 | 9/1991 | McGowan | 431/344 |
| 5,098,054 | 3/1992 | Dyer | 248/313 |
| 5,365,689 | 11/1994 | Holliman | 248/515 |
| 5,584,403 | 12/1996 | Sipperly | 248/205.2 |

*Primary Examiner*—Ramon O. Ramirez
*Assistant Examiner*—Willie Berry, Jr.
*Attorney, Agent, or Firm*—Herzog, Crebs & McGhee, LLP

[57] ABSTRACT

A device for retaining a sample cylinder is adjustable such that the sample cylinder may be positioned in various angular orientations relative to a support structure. The cylinder holder device includes a mounting bracket adapted to be fixed to the support structure. A cylinder tray is rotatably mounted to the support bracket, with the tray adapted to retain the sample cylinder. A retractable engaging device is fixed to the mounting bracket and selectively engages various apertures in the cylinder tray to change the angular orientation of the cylinder tray and thus the sample cylinder relative to the mounting bracket and the support structure. The apertures are spaced to provide predetermined angular orientations.

15 Claims, 4 Drawing Sheets

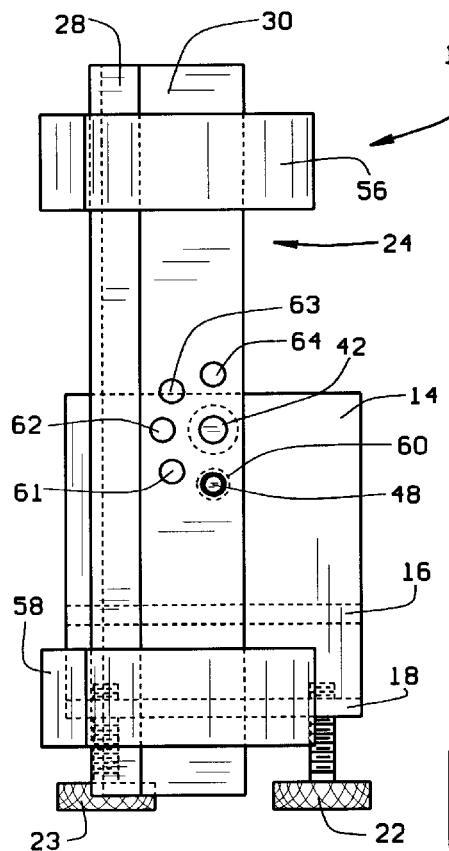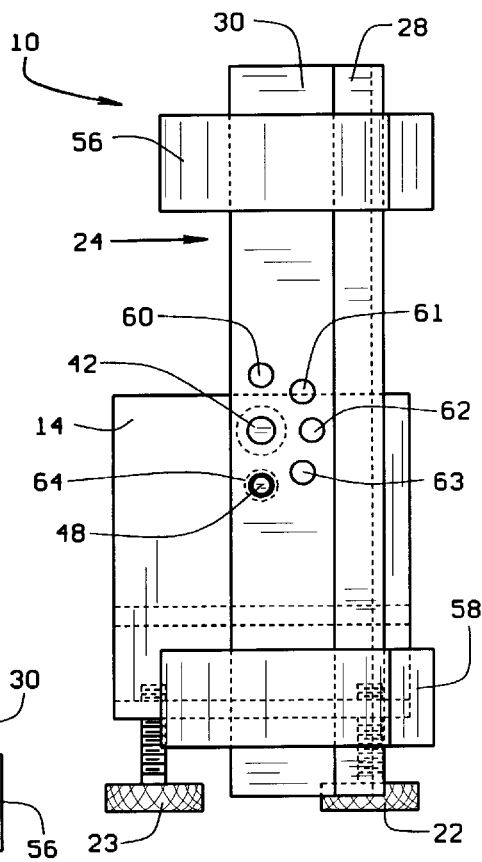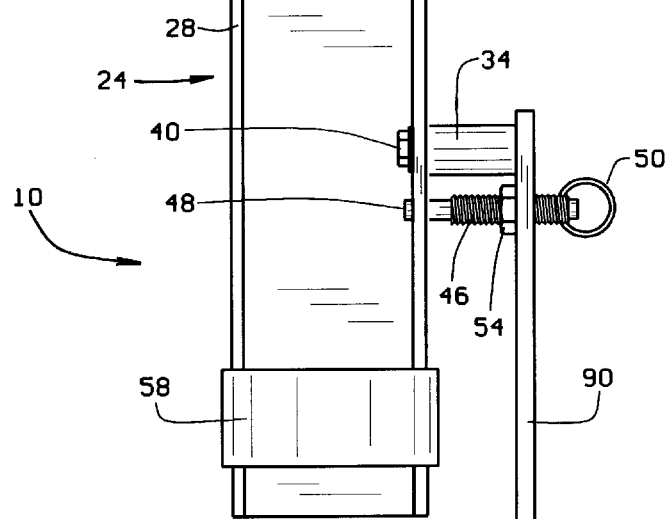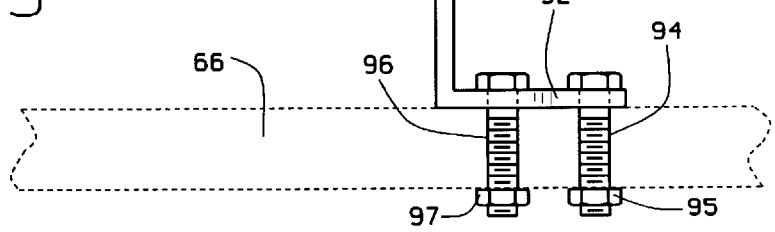

POSITIONABLE HOLDER FOR SAMPLE CYLINDER

BACKGROUND OF THE INVENTION

The present invention relates to devices for holding an object in various positions and, more particularly, to a holder for a sample cylinder that is capable of holding the cylinder in various positions.

DESCRIPTION OF THE PRIOR ART

In the gas commodity industry as well as liquid commodity industries, it is standard to periodically sample and store the gas or liquid for later analysis. This is necessary for various reasons such as energy content, constituent analysis and the like. Generally, the samples are taken over a period of time at a remote pipeline location. The plurality of samples are collected and stored in a sample cylinder. The sample cylinder that holds the gas or liquid sample thus periodically needs to be removed from the sampling site and taken to a laboratory for such analysis.

When attempting to perform analysis of the contents of the sample cylinder, it is necessary to restrain or hold the sample cylinder in order to hook up equipment necessary to retrieve the contents. It has been known to simply lay the sample cylinder on a shelf or the workbench. This practice is not satisfactory in that the sample cylinder may freely roll around or even fall off of the supporting structure. It has also been known to position the sample cylinder in a drawer or box when a vertical orientation is desired rather than a horizontal orientation. This too, though, has its attendant disadvantages.

The inventor knows of no prior art device that can securely hold or retain a sample cylinder to or proximate a working area in order to retrieve the contents from the cylinder. Furthermore, there is not known any prior art holder which can securely retain a sample cylinder in various orientations relative to the work surface.

It is thus an object of the present invention to provide a sample cylinder holder that may be mounted to a work bench or table and which allows for the quick and easy retention of the sample cylinder.

It is another object of the present invention to provide a sample cylinder holder that is variably positionable relative to the work surface such that the sample cylinder may be retained at various angular orientations.

SUMMARY OF THE INVENTION

In keeping with the above, the present invention is a sample cylinder holder that is mountable to a work bench or table and which can orient the retained sample cylinder in various angular positions.

In one form thereof, the present invention includes a mounting bracket or plate that is fixed to a work surface and a cylinder holder swivably coupled to the mounting plate. The mounting bracket includes at least one clamp and is adapted to be attached at the end of a table or work bench. The cylinder holder comprises an elongated channel wherein the sample cylinder rests and includes a plurality of apertures whereby the angular orientation of the cylinder holder may be releasably fixed relative to the mounting bracket. The mounting bracket includes a spring loaded retractable pin that extends to the cylinder holder to releasably affix the cylinder holder's angular position relative to the mounting bracket. The mounting bracket includes padding for the sample cylinder and Velcro® straps to retain the cylinder thereon.

In another form, the mounting bracket is adapted to be attached to the top surface of a table or work bench.

DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments. Reference the appended drawings, wherein:

FIG. 7 is a front elevation view of the present positionable cylinder holder with the cylinder holder retained in the vertical position after clockwise movement thereof;

FIG. 8 is a front elevation view of the present positionable cylinder holder with the cylinder holder in a vertical position after counter-clockwise rotation thereof; and FIG. 9 is a side view of the present positionable cylinder holder with an alternative mounting bracket.

DESCRIPTION OF THE PREFERRED EMBODIMENT

Figure 2:
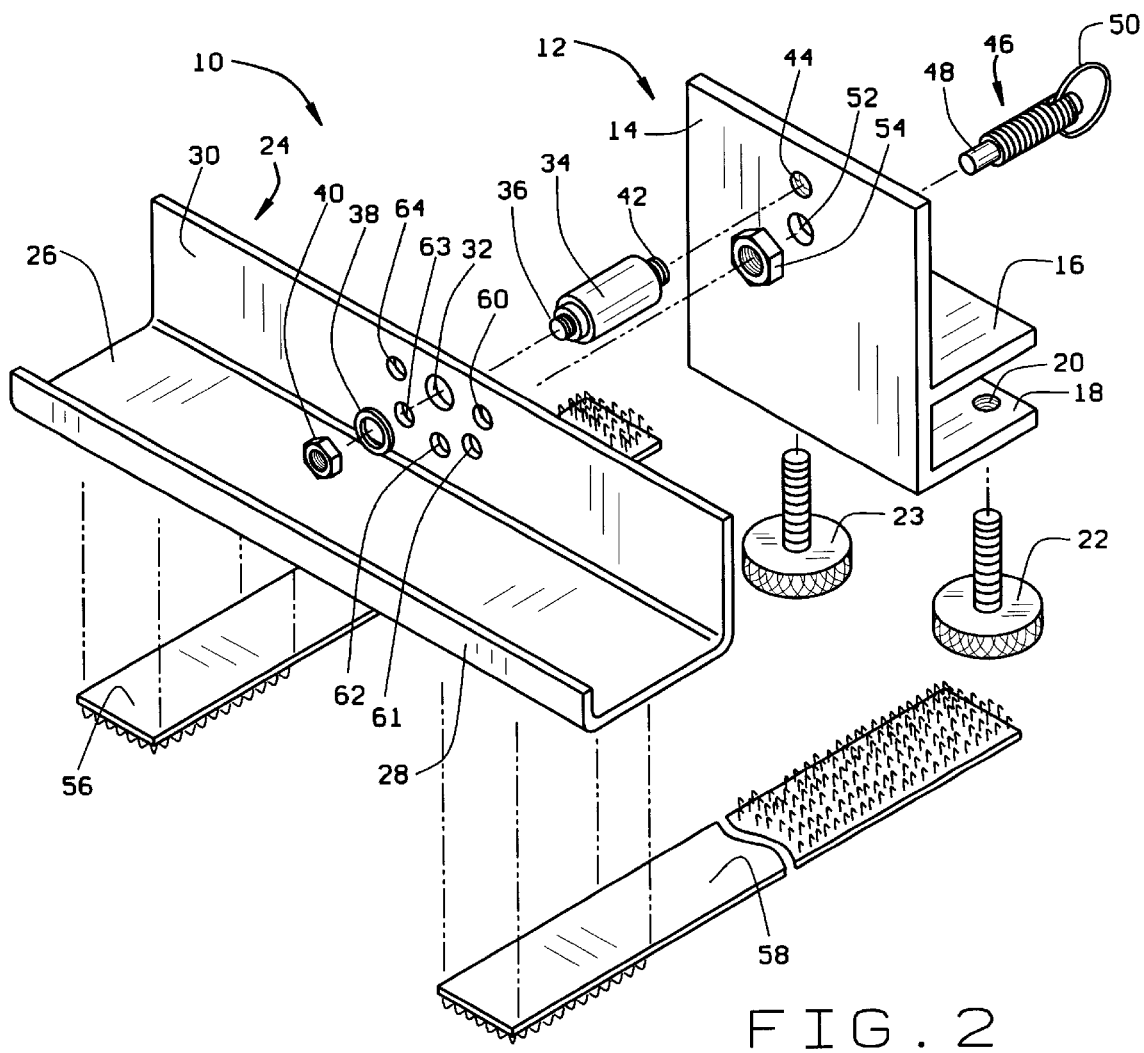
FIG. 2 is an exploded view of the positionable cylinder holder.

Referring now to FIG. 2, there is shown the present positionable cylinder holder, generally designated 10 in exploded view. The positionable cylinder holder 10 includes a mounting plate or bracket 12 composed of a back plate 14 and upper and lower transverse support plates 16 and 18. In the preferred form, the mounting bracket 12 is formed of steel but can be any other suitable material. The upper and lower support plates 16 and 18 are spaced relative to each other so as to receive an end of a table or bench therein. The lower support plate 18 includes two threaded apertures of which only one threaded aperture 20 is visible. The threaded apertures receive threaded turn knobs or clamps in order to secure the mounting bracket 12 to a table or bench 66 (see FIGS. 3 and 4). Of course, the number of apertures and clamps may vary.

The positionable cylinder holder 10 further includes a cylinder holder or tray 24 comprised of an elongated bottom member 26, a transverse or upturned front member 28, and a transverse or upturned rear member 30. Like the mounting bracket 12, the cylinder tray 24 is preferably formed of a metal such as steel, but other suitable materials would suffice. The length of the cylinder tray 24 is preferably slightly less than the length of a standard sample cylinder. However, any length is suitable that will support a sample cylinder.

The rear plate 30 of the cylinder tray 24 includes a central aperture 32 for receiving a threaded rod 36 of a connector 34. The connector 34 is attached to the rear plate 30 by a washer 38 and nut 40 such that the cylinder tray 24 is rotatable about the connector 34 and, more specifically, about the central longitudinal axis of the connector 34. The other threaded end 42 of the connector 34 is fixedly received in a threaded aperture or mounting bore 44 in the back plate 14 of the mounting bracket 12. Alternatively, the other end 42 of the connector may be welded to the back plate 14. The attachment of the connector 34 to the back plate 14 and the cylinder tray 24 thus allows the cylinder tray 24 to rotate freely therearound while the connector 34 is fixed relative to the mounting bracket 12.

The back plate 14 of the mounting bracket 12 further includes a bore 52, that may or may not be threaded, disposed axially below the threaded bore 44. The bore 52 receives a threaded spring pin 46 therethrough. The spring pin 46 is retained from movement relative to the bore 52 by a nut 54 that is threadedly received on the threaded body of the spring pin 46. The spring pin 46 has an internal piston or rod 48 which is naturally biased in the outward or extended position. A ring 50 is attached to one end of the piston 48 for releasably retracting the piston 48 when necessary.

Figure 1:
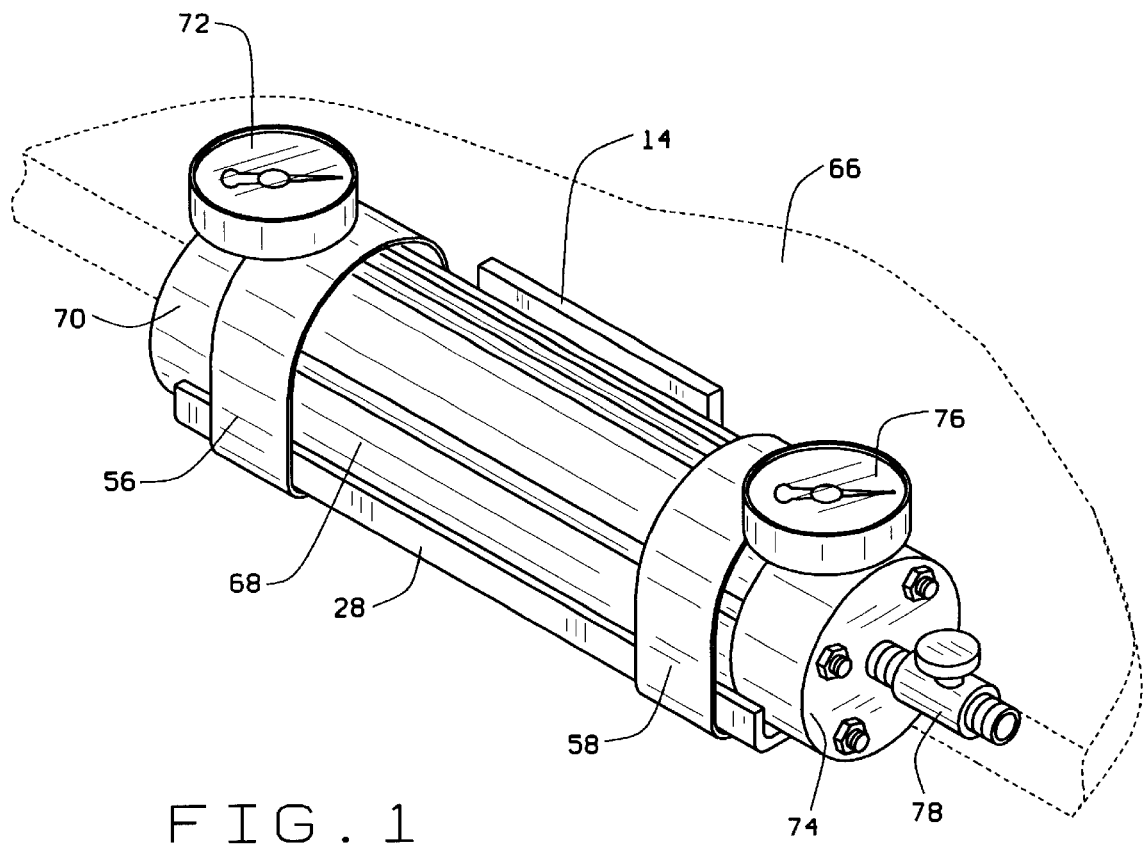
FIG. 1 is a perspective view of a sample cylinder being retained in the present positionable cylinder holder.

The cylinder tray 24 includes a series or plurality of apertures here labeled 60, 61, 62, 63, and 64 that are sized to receive the piston rod 48. The apertures 60, 61, 62, 63, and 64 are spaced to provide various angles of the cylinder tray 24 relative to the mounting bracket 12 as described below. The positionable cylinder holder 10 further includes two Velcro® straps 56, 58 that are adapted to extend about the cylinder tray 24. Referring to FIG. 1, a typical sample cylinder 68 is shown secured in the cylinder tray 24 with the straps 56, 58 secured thereabout. The typical sample cylinder 68 includes a body with a first cap 70 and gauge 72 on one end and a second end cap 74 and gauge 76 on the other. A valve 78 is disposed in the end cap 74 and is in communication with the interior of the sample cylinder 68 in order to introduce the gas or liquid into the sample cylinder and for retrieving the gas or liquid therefrom.

Figure 4:
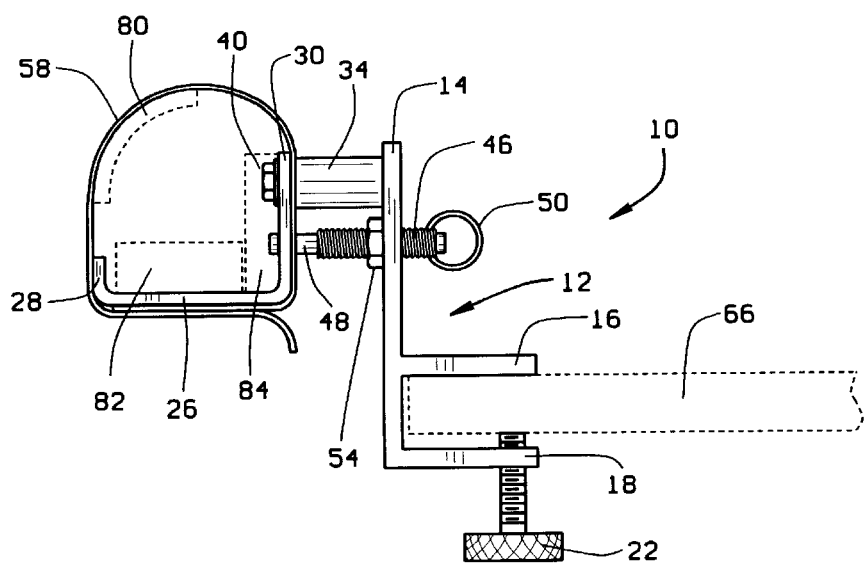
FIG. 4 is a side view of the positionable cylinder holder relative to FIG. 3.
Figure 5:
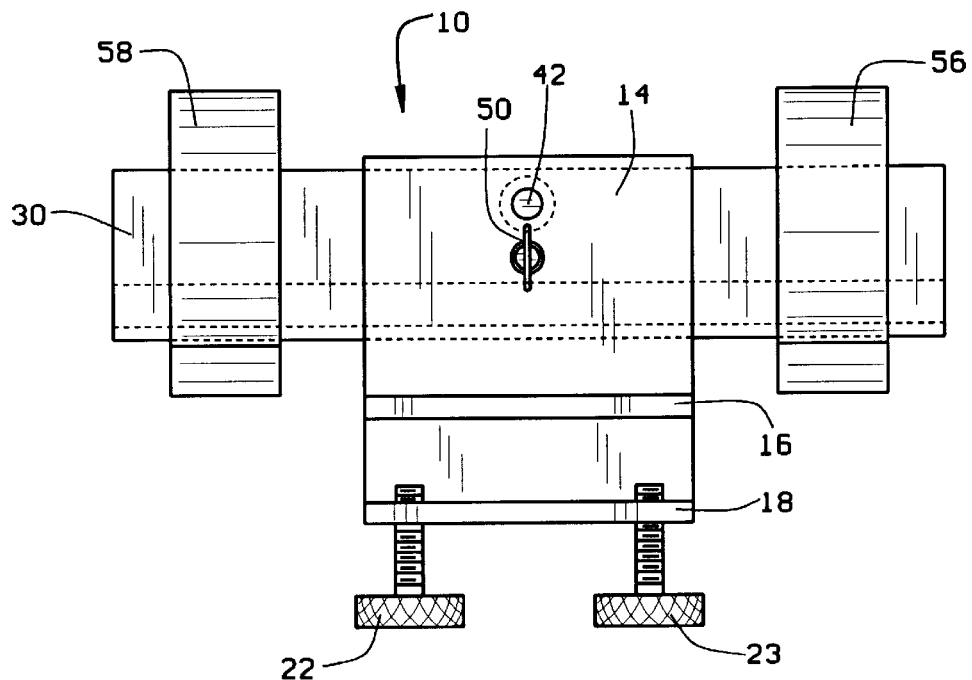
FIG. 5 is a rear elevation of the present positionable cylinder holder.
Figure 6:
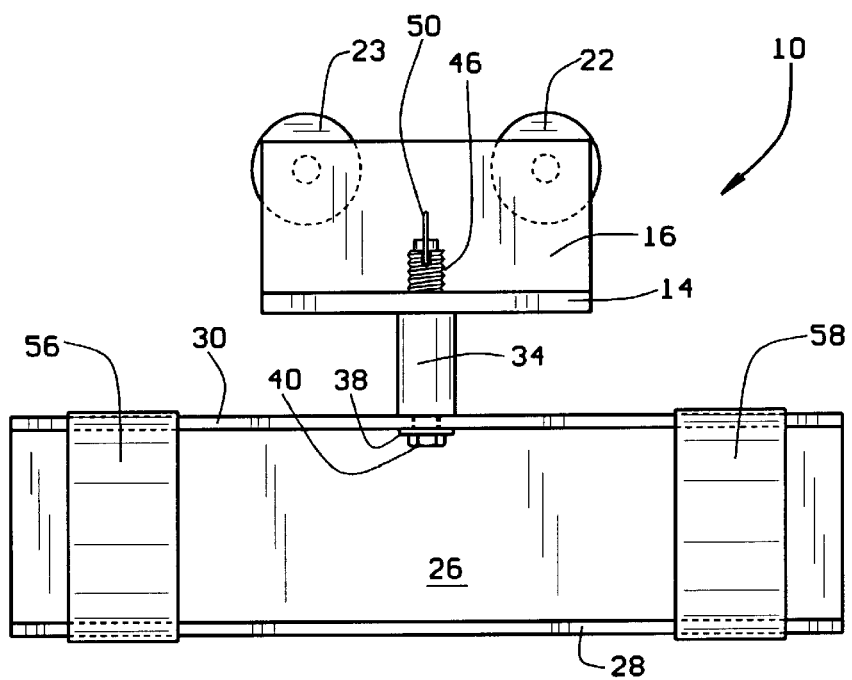
FIG. 6 is a top plan view of the present positionable cylinder holder.

FIGS. 5 and 6 show different views of the present positionable cylinder holder 10 for clarity wherein the cylinder tray 24 is in the horizontal position. Additionally, with reference to FIG. 4, the mounting bracket 12 is shown attached to the table top 66. The table top 66 fits between the transverse support plates 16 and 18 with the clamp, here 22, securing the same thereto. Also, the cylinder tray 24 preferably includes pads 80, 82, and 84 for cushioningly supporting the sample cylinder 68.

Figure 3:
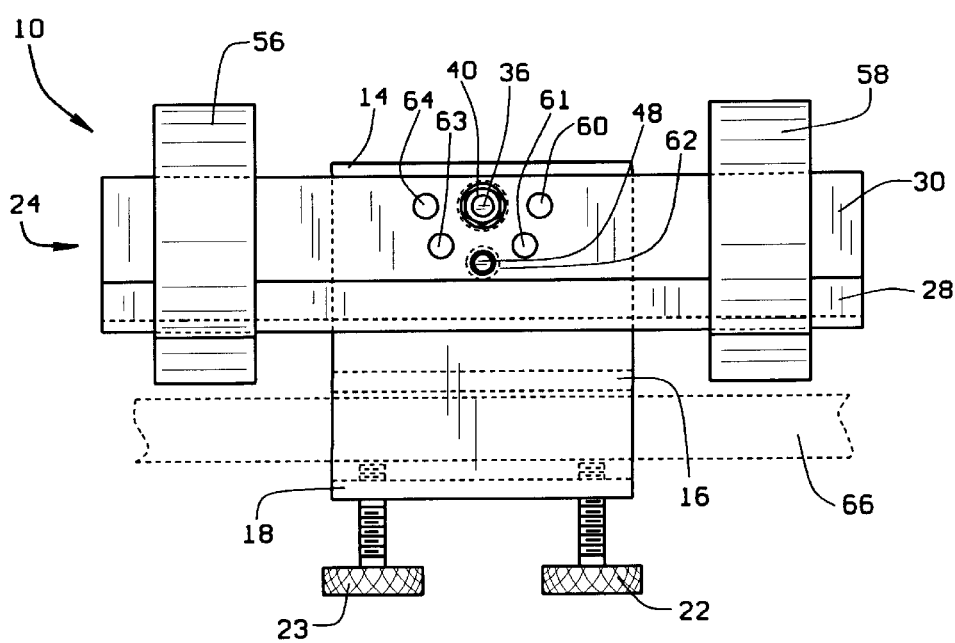
FIG. 3 is a front elevation view of the positionable cylinder holder.

According to an aspect of the present invention and referring to FIGS. 3, 7, and 8, the angular orientation adjustability of the cylinder tray 24 will be described. As noted above, the cylinder tray 24 has five apertures, 60, 61, 62, 63, and 64, wherein the piston rod 48 of the threaded spring pin 46 extends in order to lock the cylinder tray 24 from rotation relative to the mounting bracket 12. When the piston 48 is in hole 62, the cylinder tray 24 is essentially parallel with the table and ground and is thus in a horizontal position. If it is desired to change the angular orientation of the cylinder tray 24, the ring 50 is pulled thereby retracting the piston 48 from the apertures so as to allow the cylinder tray 24 to rotate. The ring is released when the angular orientation of the cylinder tray 24 is as the operator wishes to lock the piston 48 into a respective aperture.

Refer ring to FIG. 7, the piston 48 extends into aperture 60 wherein the cylinder tray 24 is in a vertical orientation on the left side thereof as seen from the front. When the piston rod 48 is in hole 64, the cylinder tray 24 is likewise in a vertical position but on the right side of the cylinder holder. This allows either end of the cylinder 68 to be up or down. Although not shown, if the piston rod 48 was in hole 61 or 63, the cylinder tray 24 would form a 45° angle relative to the horizontal.

It should be understood that the number of apertures in the cylinder tray 24 are for illustration only in order to position the cylinder tray 24 into preset angular positions. There would, of course, be additional holes if increments other than 45°, 90°, or horizontal is desired.

An additional embodiment of the mounting bracket is shown in FIG. 9. In this embodiment, the mounting bracket includes an elongated back plate 90 and a transverse angle plate 92 attached at one end. Bolts 94 and 96 extend through the plate 92 and table 66 and are secured by respective nuts 95 and 97. In this embodiment, the mounting bracket allows the positionable cylinder holder 10 to be mounted directly on top of the table 66. The plate 90 needs to be of sufficient height such that the rotation of the cylinder holder tray 24 can freely rotate about the connector 34.

While the foregoing is directed to the preferred embodiment of the present invention, other and further embodiments of the invention may be devised without departing from the basic scope thereof, and the scope thereof is determined by the claims which follow.

What is claimed is:

1. A laboratory fixture adapted to hold a sample cylinder while the cylinder contents are discharged for analysis, said fixture comprising:

a mounting bracket;

at least one clamp coupled to said mounting bracket adapted to removably attach said bracket to a support structure;

a swivel connected to said mounting bracket;

a cylinder holder sized and dimensioned to receive and hold the sample cylinder, said cylinder holder rotatably mounted on said swivel to facilitate positioning of said cylinder holder and the sample cylinder at different angular orientations relative to the support structure;

a plurality of apertures in said cylinder holder positioned adjacent to said mounting bracket; and a retractable locking pin in said mounting bracket, said pin extending beyond said mounting bracket and selectively engaging at least one of said apertures to lock said cylinder holder and the sample cylinder in a predetermined angular orientation relative to the support structure.

2. The apparatus of claim 1 further including at least one removable strap to secure the sample cylinder in said cylinder holder.

3. The apparatus of claim 2 further including padding material affixed to said cylinder holder to cushion the sample cylinder.

4. The apparatus of claim 3 wherein said apertures are positioned in said cylinder holder to permit selective adjustment of said cylinder holder and the sample cylinder to a vertical and a horizontal position relative to the support structure.

5. The apparatus of claim 1 wherein said plurality of apertures are positioned in said cylinder holder to provide a horizontal, 45°, and 90° orientation of said cylinder holder.

6. A cylinder holder for attachment to a tabletop or other similar surface, said cylinder holder comprising:

a cylinder support bracket oriented along the horizontal axis of a cylinder, said cylinder support bracket having an elongated base, an extending front side, and an extending back side, said extending back side having a first substantially horizontally-centered opening, said extending back side further including a second opening radially adjacent to said first opening at a specified distance;

a strap for securing the cylinder to said cylinder support bracket;

a clamp bracket, said clamp bracket having a vertical base, a pair of parallel extending flanges extending transversely from said vertical base, said pair of parallel extending flanges forming a C-shaped clamp wherein a tabletop or other similar surface is inserted, one of said flanges having a threaded hole in which a screw is threaded for fastening said clamp bracket to the tabletop, said vertical base of said clamp bracket further including a first threaded opening and a second opening adjacent to and at said specified distance from said first and second openings on said cylinder support bracket, respectively;

a first pin having a cylindrical shaft, said cylindrical shaft having a greater diameter than said first opening on said cylinder support bracket, said cylindrical shaft further including a pair of ends, the first of said ends having a projecting member of substantially the same size and shape of said first opening of said cylinder support bracket wherein said cylinder support bracket swivels on said first pin, said projecting member inserted into said first opening of said cylinder support bracket, the second of said ends having a projecting screw to thread into said opening in said clamp bracket; and a second pin, said second pin having a threaded end a free end, said free end inserted through said second opening on said clamp bracket and said second opening on said cylinder support bracket to secure said cylinder support bracket against pivotal movement on said clamp bracket.

7. The cylinder holder of claim 6, wherein said strap is a Velcro® strap.

8. The cylinder holder of claim 6, further comprising a second strap, wherein each of said straps secures one end of said cylinder to said cylinder support bracket.

9. The cylinder holder of claim 6, wherein said cylinder support bracket has a J-shaped configuration, the length of said extending back side greater than said length of said extending front side.

10. The cylinder holder of claim 6, wherein said projecting member of said cylindrical shaft further comprises a screw extending outward form the end of said projecting member and over said base of said cylinder support bracket.

11. The cylinder holder of claim 10, further comprising:

a nut threaded onto said screw for securing said first end of said first pin to said cylinder support bracket; and a washer having substantially the same diameter as said first opening on said cylinder support bracket, said washer positioned around said screw between said nut and said extending back side of said cylinder support bracket.

12. The cylinder holder of claim 6, further comprising a third opening positioned on said cylinder support bracket at said specified distance from said first opening at a first arcuate distance from said second opening, wherein said cylinder support bracket can be adjusted angularly with respect to said clamp bracket by removing said second pin from said second opening on said cylinder support bracket to said third opening on said cylinder support bracket.

13. The cylinder holder of claim 12, further comprising a fourth opening positioned on said cylinder support bracket at said specified distance from said first opening at a second arcuate distance from said third opening, wherein said cylinder support bracket can be adjusted angularly with respect to said clamp bracket by removing said second pin from said second opening on said cylinder support bracket to said fourth opening on said cylinder support bracket.

14. The cylinder holder of claim 13, wherein said arcuate distance is 90°, and thus said cylinder support bracket can be positioned vertically with respect to said clamp bracket.

15. The cylinder holder of claim 14, wherein said second arcuate distance is 180° and thus said cylinder support bracket can be positioned vertically with respect to said clamp bracket.

* * * * *